(12) United States Patent
Sells et al.

(10) Patent No.: US 12,202,039 B2
(45) Date of Patent: Jan. 21, 2025

(54) CIRCULATION PATHS FOR FLUID DISPENSING DEVICES

(71) Applicant: HEWLETT-PACKARD DEVELOPMENT COMPANY, L.P., Spring, TX (US)

(72) Inventors: Jeremy Sells, Corvalis, OR (US); Macia Sole Pons, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 232 days.

(21) Appl. No.: 17/594,920

(22) PCT Filed: Sep. 16, 2019

(86) PCT No.: PCT/US2019/051266
§ 371 (c)(1),
(2) Date: Nov. 3, 2021

(87) PCT Pub. No.: WO2021/054931
PCT Pub. Date: Mar. 25, 2021

(65) Prior Publication Data
US 2022/0193781 A1 Jun. 23, 2022

(51) Int. Cl.
*B29C 64/321* (2017.01)
*B22F 10/14* (2021.01)
(Continued)

(52) U.S. Cl.
CPC .............. *B22F 10/14* (2021.01); *B22F 12/53* (2021.01); *B22F 12/90* (2021.01); *B29C 64/165* (2017.08);
(Continued)

(58) Field of Classification Search
CPC ... B29C 64/321; B29C 64/386; B29C 64/209; B29C 64/165; B22F 10/14; B22F 12/53;
(Continued)

(56) References Cited

U.S. PATENT DOCUMENTS 4,460,904 A * 7/1984 Oszczakiewicz ........ B41J 2/195
347/92
6,139,136 A * 10/2000 Mackay ................... B41J 2/175
347/85
(Continued)

FOREIGN PATENT DOCUMENTS

EP          1356946      1/2005
WO   WO-2016019942 A1   2/2016
(Continued)

*Primary Examiner* — Nahida Sultana
(74) *Attorney, Agent, or Firm* — Shook, Hardy & Bacon L.L.P.

(57) ABSTRACT

In some examples, a fluid system includes a support structure to attach a fluid dispensing device comprising a fluid chamber to contain a fluid, and an orifice to dispense the fluid from the fluid chamber. The fluid system includes a circulation path comprising a path portion in the fluid dispensing device, the circulation path to circulate a fluid flow through the fluid chamber to remove, from the fluid chamber, a particle ingested through the orifice. A filter in the circulation path is to remove the particle from the circulation path.

12 Claims, 6 Drawing Sheets

(51) Int. Cl.
*B22F 12/53* (2021.01)
*B22F 12/90* (2021.01)
*B29C 64/165* (2017.01)
*B29C 64/209* (2017.01)
*B29C 64/386* (2017.01)
*B33Y 10/00* (2015.01)
*B33Y 30/00* (2015.01)
*B33Y 40/00* (2020.01)
*B33Y 50/00* (2015.01)
*B41J 2/175* (2006.01)
*B41J 2/18* (2006.01)
*B22F 1/107* (2022.01)

(52) U.S. Cl.
CPC .......... *B29C 64/209* (2017.08); *B29C 64/321* (2017.08); *B29C 64/386* (2017.08); *B33Y 10/00* (2014.12); *B33Y 30/00* (2014.12); *B33Y 40/00* (2014.12); *B33Y 50/00* (2014.12); *B41J 2/17563* (2013.01); *B41J 2/18* (2013.01); *B22F 1/107* (2022.01)

(58) Field of Classification Search
CPC ......... B22F 12/90; B33Y 40/00; B33Y 10/00; B33Y 50/00
See application file for complete search history.

(56) References Cited

U.S. PATENT DOCUMENTS

| | | | |
|---|---|---|---|
| 7,087,109 B2 | 8/2006 | Bredt et al. | |
| 7,387,359 B2 | 6/2008 | Hernandez et al. | |
| 7,435,368 B2 | 10/2008 | Davidson et al. | |
| 7,828,022 B2 | 11/2010 | Davidson et al. | |
| 7,905,951 B2 | 3/2011 | Williams | |
| 8,794,263 B2* | 8/2014 | Scott | B22F 12/70 264/497 |
| 2005/0157061 A1* | 7/2005 | Silverbrook | B41J 2/1637 347/42 |
| 2005/0280185 A1 | 12/2005 | Russell et al. | |
| 2012/0274685 A1* | 11/2012 | Mis | B41J 2/18 347/89 |
| 2015/0077451 A1 | 3/2015 | Benjamin et al. | |
| 2016/0243619 A1 | 8/2016 | Gothait et al. | |
| 2017/0313091 A1 | 11/2017 | Camino Salinas et al. | |
| 2018/0015732 A1 | 1/2018 | Chen et al. | |
| 2018/0126650 A1* | 5/2018 | Murphree | B29C 64/25 |
| 2018/0326661 A1* | 11/2018 | Johnson | B33Y 40/00 |
| 2019/0016135 A1 | 1/2019 | Rivas et al. | |

FOREIGN PATENT DOCUMENTS

| | | |
|---|---|---|
| WO | WO-2016173668 | 11/2016 |
| WO | WO-2018001441 | 1/2018 |

\* cited by examiner

CIRCULATION PATHS FOR FLUID DISPENSING DEVICES

BACKGROUND

Additive manufacturing machines produce three-dimensional (3D) objects by building up layers of material. A type of an additive manufacturing machine is referred to as a 3D printing system. Additive manufacturing machines are able to receive as input a computer aided design (CAD) model or other digital representation of a physical 3D object to be formed, and build, based on the CAD model, the physical 3D object. The model may be processed into layers by the additive manufacturing machine, and each layer defines a corresponding part (or parts) of the 3D object.

BRIEF DESCRIPTION OF THE DRAWINGS

Some implementations of the present disclosure are described with respect to the following figures.

Figure 1:
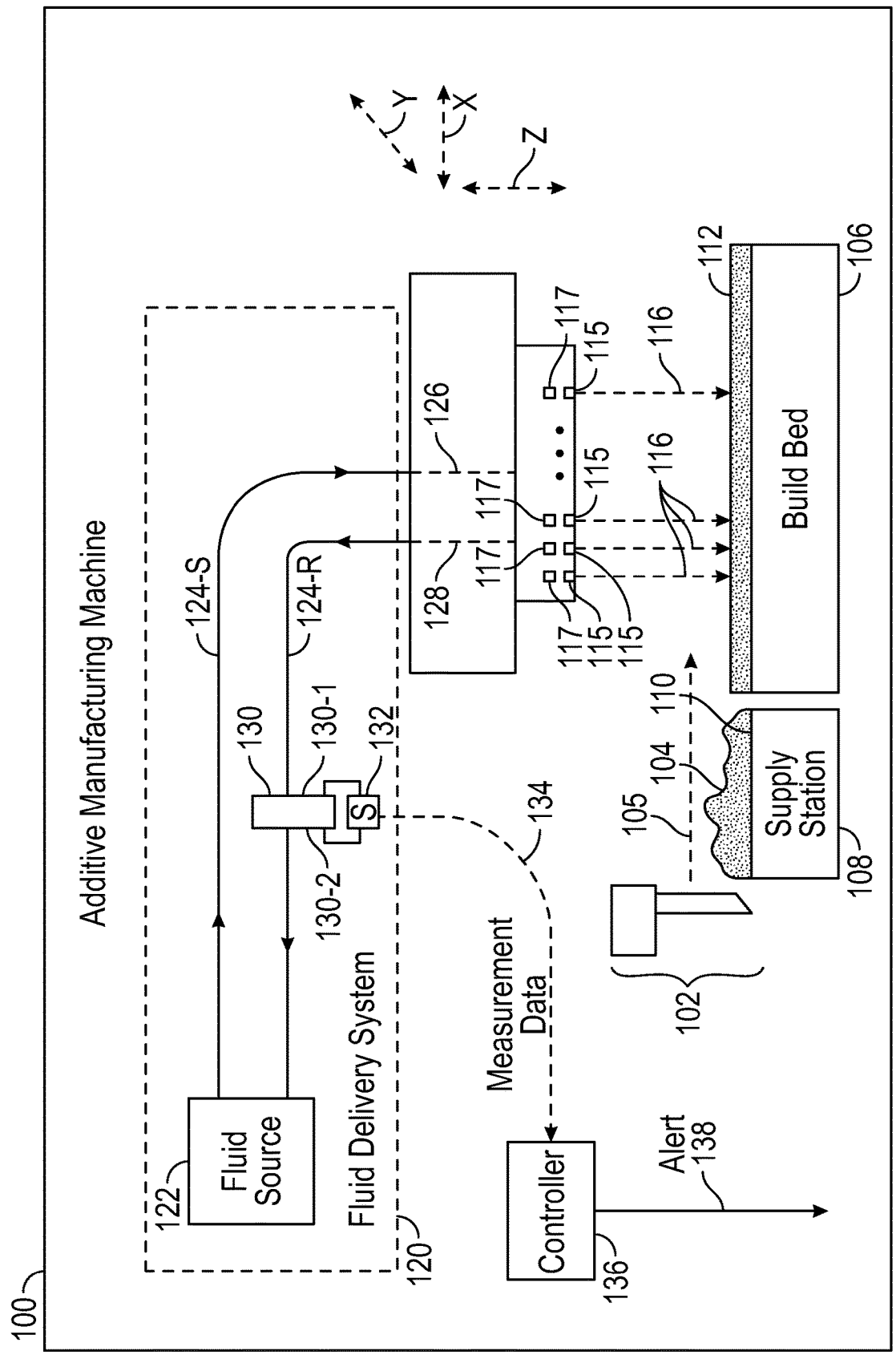
FIG. 1 is a block diagram of an additive manufacturing machine, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An additive manufacturing machine such as a three-dimensional (3D) printing system can build 3D objects by forming successive layers of build material and processing each layer of build material on a build platform. In some examples, a build material can include a powdered build material that is composed of particles in the form of fine powder or granules. The powdered build material can include metal particles, plastic particles, polymer particles, ceramic particles, or particles of other powder-like materials. In some examples, a build material powder may be formed from, or may include, short fibers that may, for example, have been cut into short lengths from long strands or threads of material.

In some examples, as part of the processing of each layer of build material, liquid agents can be dispensed (such as through a printhead or another fluid dispensing device) to the layer of build material. Examples of liquid agents include a fusing agent (which is a form of an energy absorbing agent) that absorbs heat energy emitted from an energy source used in the additive manufacturing process. For example, after a layer of build material is deposited onto a build platform (or onto a previously formed layer of build material) in the additive manufacturing machine, a fusing agent with a target pattern can be deposited on the layer of build material. The target pattern can be based on an object model (or more generally, a digital representation) of the physical 3D object that is to be built by the additive manufacturing machine.

According to an example, a fusing agent may be an ink-type formulation including carbon black, such as, for example, the fusing agent formulation commercially referred to as the V1Q60A "HP fusing agent" available from HP Inc. In an example, a fusing agent may additionally include an infrared light absorber, a near infrared light absorber, a visible light absorber, or an ultraviolet (UV) light absorber. Fusing agents can also refer to a chemical binding agent, such as used in a 3D printing system that forms objects using a metal or other type of build material. In further examples, other types of additive manufacturing agents can be added to a layer of build material.

Following the application of the fusing or binding agent, an energy source (e.g., including a heating lamp or multiple heating lamps that emit(s) energy) is activated to sinter, melt, fuse, bind, or otherwise coalesce the powder of the layer of build material underneath the fusing or binding agent. The patterned build material layer (i.e., portions of the layer on which the fusing or binding agent was deposited) can solidify, for example after cooling, and form a part, or a cross-section, of the physical 3D object.

Next, a new layer of powder is deposited on top of the previously formed layer, and the process is re-iterated in the next additive manufacturing cycle to form 3D parts in the successive layers of build material. The 3D parts collectively form a 3D object (or multiple 3D objects) that is the target of the build operation.

In other examples, an additive manufacturing machine can be used as part of a sintering process. In the sintering process, as each layer of build material is deposited, a binder (which is another type of liquid agent) is applied by a printhead or other fluid dispensing device to the layer of build material. Portions of the build material where the binder is applied are bound together by the binder. The binder can include an ultraviolet-curable binder, heat-curable binder, and so forth. After the layers of build material have been deposited and the binder applied to locations of each layer of build material, curing of the binder produces a so-called "green part." The green part is de-powdered to remove any unbound build material powder. Afterwards, the green part can be transferred to an oven, where the bound build material powder (e.g., metal particles, etc.) are sintered together to form a highly dense 3D object.

A fluid dispensing device includes nozzles to dispense a liquid agent to a layer of build material. In some examples, the fluid dispensing device can be mounted to a moveable carriage in the additive manufacturing machine. During a build process, the carriage can move back and forth along a scan axis, or multiple scan axes, to deliver liquid agents to the layer of build material.

A rapid movement of the carriage can result in turbulence that may cause powder on the layer of build material to rise towards the fluid dispensing device, such as in a cloud of powder. In addition, when liquid agent droplets dispensed from the fluid dispensing device hit the layer of build material, the impact can cause power particles to lift up from the layer of build material. The fine particles of the powder can be ingested through orifices of the nozzles of the fluid dispensing device.

Inside the fluid dispensing device, the particles can travel through the orifices and into respective fluid chambers in fluid communication with the orifices. A fluid chamber contains a fluid to be dispensed through the orifice of the fluid dispensing device.

In some examples, a fluid dispensing device may include a particle tolerant architecture (PTA) that includes pillars (or more generally, obstacles) between fluid chambers and a backside channel in the fluid dispensing device. The backside channel transports a fluid that is to be fed to the fluid chambers of the fluid dispensing device. There can be a pillar (or multiple pillars) between each fluid chamber and the backside channel. The pillars are arranged to prevent fibers or other contaminants that may be present in the fluid contained in the backside channel from being delivered to the fluid chambers. This prevents the contaminants from being dispensed outwardly through the orifices of the fluid dispensing device onto a layer of build material.

However, the presence of the pillars can cause particles ingested through the orifices of the fluid dispensing device to be trapped at the pillars, which can cause blockage of fluid chambers where the particles are trapped. If a fluid chamber is blocked, then fluid dispensing operation through the corresponding orifice of the fluid dispensing device may be disrupted.

In accordance with some examples of the present disclosure, the obstacles (e.g., pillars) between the fluid chambers of a fluid dispensing device and a backside channel of the fluid dispensing device are removed to provide a non-PTA arrangement. Without the obstacles, any particles (such as powder particles of an additive manufacturing machine) ingested through an orifice of the fluid dispensing device can be allowed to pass through the corresponding fluid chamber and to the backside channel. To allow for removal of particles that have been ingested into fluid chambers through corresponding orifices, a fluid circulation path is provided to circulate fluid flow through the fluid chambers. The circulated fluid flow is able to transport any particles away from the fluid chambers through the backside channel and out of the fluid dispensing device.

In accordance with some implementations of the present disclosure, a filter is provided in the circulation path to remove particles that are carried in the circulated fluid flow.

FIG. 1 shows an example additive manufacturing machine 100, which in some examples can include a 3D printer. The additive manufacturing machine 100 includes a spreader 102 that is used to spread a build material 104 (in powder form) onto a build bed 106. The build bed 106 can either be a base plate (if a first layer of build material is being dispensed) or a previously formed 3D part (formed using a layer build material or multiple layers of build material). The spreader 102 can be in the form of a blade, a roller, and so forth.

The spreader 102 is moved along a spreading direction 105 (or multiple spreading locations), starting at a supply station 108 that supplies the build material 104. A dispensing surface 110 of the powder supply station 108 has a supply of build material 104 that is spread by the spreader 102 across the upper surface of the build bed 106 as the spreader 102 is moved in the spreading direction 105 across the build bed 106. A layer of build material 112 (hereinafter referred to as a "build material layer") is formed on the build bed 106.

Once the build material layer 112 is formed on the build bed 106, a fluid dispensing device 114 (which can include a printhead, for example) can be activated to dispense a liquid agent 116 onto a surface of the build material layer 112. The fluid dispensing device 114 can include an array of nozzles 115 that include respective orifices through which drops of the liquid agent can be dispensed towards the build material layer 112. In some examples, the fluid dispensing device 114 (or multiple fluid dispensing devices) can dispense different types of liquid agents onto the build material layer 112.

The fluid dispensing device 114 (or multiple fluid dispensing devices) can be attached to a carriage 118 or any other type of support structure of the additive manufacturing machine 100. In some examples, the fluid dispensing device 114 is removably attached to the carriage 118. Thus, the additive manufacturing machine 100 can initially be provided without the fluid dispensing device 114, such as during transport of the additive manufacturing machine 100 from a seller or manufacturer to a customer or other end user. The end user can then attach the fluid dispensing device 114 to the carriage 118 prior to use of the additive manufacturing machine 100.

In some examples, the carriage 118 is moveable along a scan axis, or multiple scan axes. For example, the carriage 118 is moveable along a scan axis X. In other examples, the carriage 118 is moveable along multiple scan axes X and Y. The scan axes X and Y are generally horizontal in the view of FIG. 1, and extend in a plane that is generally perpendicular to the direction of travel of liquid agents being dispensed by the fluid dispensing device 114 toward the build material layer 112.

Also, in some examples, the carriage 118 may be moveable along a vertical axis Z (in the view of FIG. 1) relative to the build bed 106. The vertical axis Z is generally perpendicular to each of the horizontal scan axes X and Y.

In other examples, the carriage 118 can be fixed in place, but the build bed 106 is moveable relative to the carriage 118 along any or some combination of axes X, Y, and Z.

In alternative examples, both the carriage 118 and the build bed 106 are moveable relative to each other.

The additive manufacturing machine 100 includes a fluid delivery system 120, which includes a fluid source 122. The fluid source 122 includes a reservoir to store a liquid agent that is to be delivered to the fluid dispensing device 114 that is attached to the carriage 118. In some examples, the fluid source 122 is a pressurized fluid source that can create a pressure differential to cause a flow of fluid from the fluid source 122 to the fluid dispensing device 114. For example, the pressurized fluid source 122 can include a fluid pump that creates the pressure differential.

In other examples, multiple fluid sources 122 can be provided to deliver respective different liquid agents to the fluid dispensing device 114 that is attached to the carriage 118.

In accordance with some implementations of the present disclosure, the fluid source 122 causes fluid to circulate in a circulation path that includes a supply circulation path segment 124-S, and a return circulation path segment 124-R. Fluid is transported from the fluid source 122 through the supply circulation path segment 124-S to the carriage 118, and through a fluid channel 126 in the carriage 118 to the fluid dispensing device 114. After flowing through the fluid dispensing device 114, the fluid returns from the fluid dispensing device 114 through a fluid channel 128 in the carriage 118 and through the return circulation path segment 124-R to the fluid source 122.

The circulation path for the circulated fluid flow includes the supply circulation path segment 124-S, the carriage fluid channel 126, fluid channels in the fluid dispensing deice 114, the carriage fluid channel 128, and the return circulation path segment 124-R.

In accordance with some implementations of the present disclosure, any powder particles (or other types of particles) ingested through the orifices of the nozzles 115 into respective fluid chambers 117 of the fluid dispensing device 114 can be carried by the circulated fluid flow along the circulation path away from the fluid chambers 117 and back along the return circulation path segment 124-R.

A filter 130 is provided in the return circulation path segment 124-R to remove any particles contained in the fluid flowing in the return circulation path segment 124-R. In some examples, the filter 130 can capture any particles that have a size greater than 0.5 micrometers (μm). In further examples, the filter 130 can capture particles having a size of greater than another threshold size, such as 1 μm, 2 μm, 10 μm, 20 μm, 30 μm, 50 μm, 100 μm, and so forth. A "size" of a particle can refer to a diameter of the particle (assuming the particle is generally spherical in shape) or any other dimension of the particle, where the dimension represents an extent of the particle from one edge to another edge.

Fluid flowing in the return circulation path segment 124-R flows through the filter 130, which is able to remove any particles of specified sizes that flow through the return circulation path segment 124-R.

Although FIG. 1 shows placement of the filter 130 in the return circulation path segment 124-R, it is noted that in other examples, the filter 130, or another filter, may be placed in the supply circulation path segment 124-S. In further examples, multiple filters may be included in the fluid delivery system 120.

In some examples, the fluid delivery system 120 can be separate from the carriage 118. In further examples, the fluid delivery system 120 can be mounted on the carriage 118.

In alternative examples, instead of arranging the filter 130 to be separate from the carriage 118 the filter 130 can be part of the carriage 118, and can be placed to remove particles from fluid flowing through the channel 126 or 128 in the carriage 118.

In some examples, a sensor 132 can be associated with the filter 130. The sensor 132 can detect a condition of the filter 130. For example, the sensor 132 includes a pressure sensor that detects a pressure gradient across the filter 130, from one side 130-1 of the filter 130 the other side 130-2 of the filter 130. An unclogged filter 130 will have a relatively low pressure gradient across the filter 130 between the sides 130-1 and 130-2. However, as the filter 130 collects particles, the filter 130 becomes clogged, which increases the pressure differential across the filter 130 between the sides 130-1 and 130-2.

In other examples, other types of sensors can be employed, such as sensors for detecting electrical conductivity or resistivity across the filter 130 between the first side 130-1 and the second side 130-2.

The sensor 132 can send measurement data 134 to a controller 136. For example, the measurement data 134 can include pressure data.

As used here, a "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

The controller 136 determines from the measurement data 134 whether the filter 130 should be replaced. For example, if the measured pressure across the filter 130 exceeds a specified threshold, then that indicates that the filter 130 is clogged and should be replaced.

If the controller 136 determines from the measurement data 134 that the filter 130 should be replaced, the controller 136 can issue an alert 138. The alert 138 can be in the form of a visual indicator, which can include activation of a light indicator on the additive manufacturing machine 100. Alternatively, the alert 138 can include a message, such as an e-mail message, a text message, or other information sent to a remote computing device, such as a desktop computer, a notebook computer, a tablet computer, a smartphone, and so forth.

More generally, the controller 136 receives the measurement data 134 of the sensor 132, and outputs an indication of a condition of the filter 130 in response to the measurement data 134.

Figure 2:
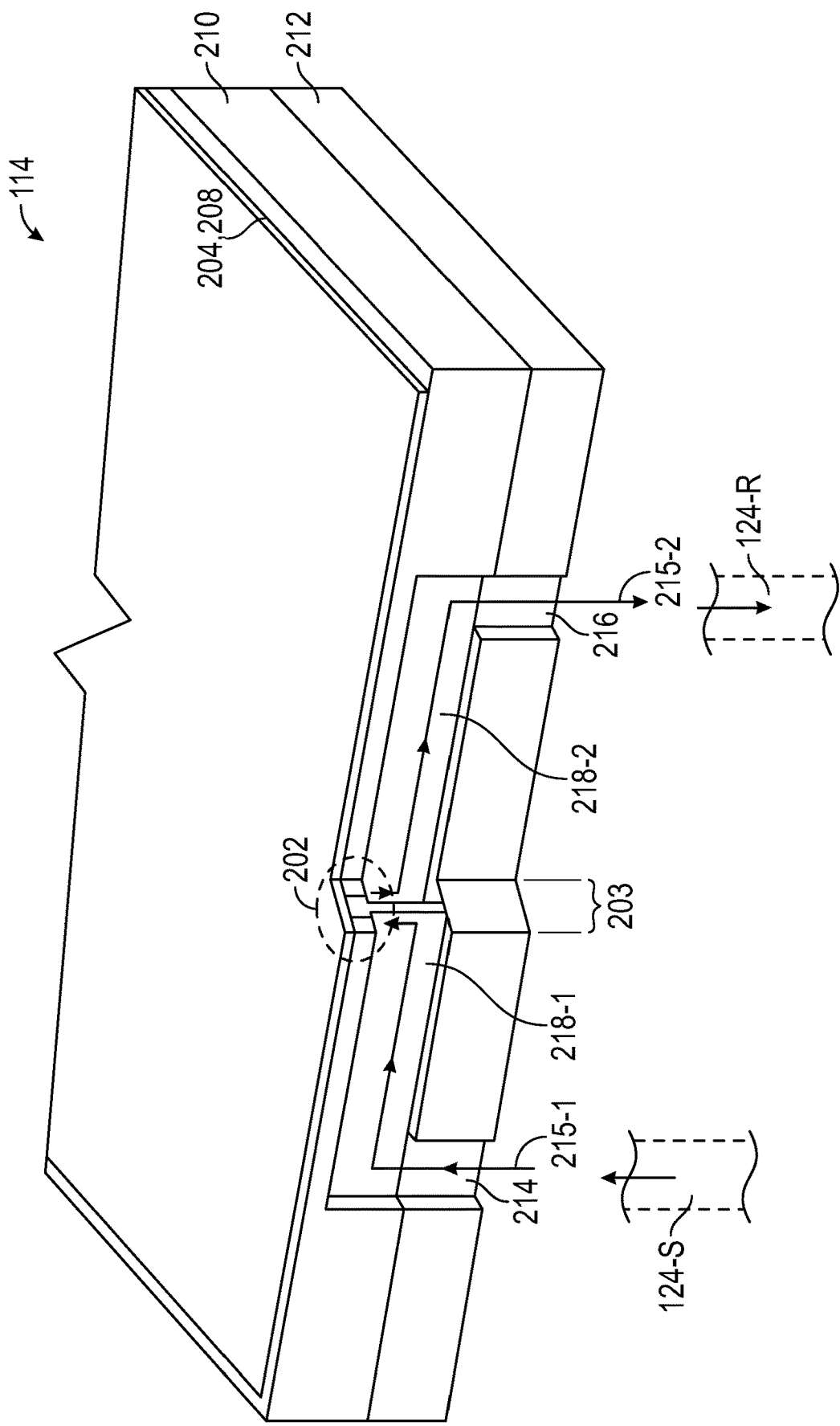
FIG. 2 is a perspective view of a portion of a fluid dispensing device, in accordance with some examples.

FIG. 2 is a perspective view of a portion of the fluid dispensing device 114. In some examples, the fluid dispensing device 114 can include a fluidic die, such as a printhead die used in printing operations. A "die" refers to an assembly where various layers are formed onto a substrate to fabricate circuitry, fluid chambers, and fluid conduits. Multiple fluidic dies can be mounted or attached to a support structure.

FIG. 2 shows various layers of a fluidic die that forms part of the fluid dispensing device 114. The fluidic die includes a substrate (not shown) on which various layers are formed. The layers include an interposer layer 212 and a backside channel layer 210 formed on the interposer layer 212.

Figure 3:
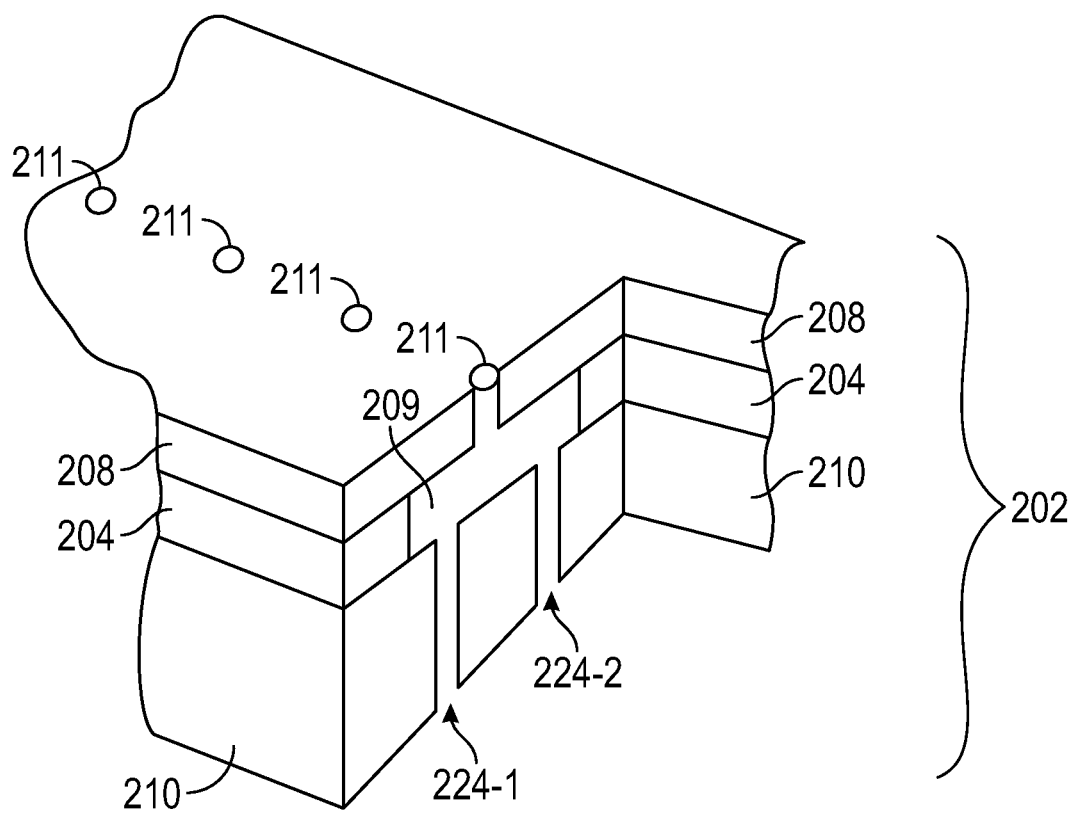
FIG. 3 is an enlarged view of a portion of the fluid dispensing device, according to some examples.

A portion 202 of the fluidic die is shown in an enlarged view of FIG. 3. In the view of FIG. 3, a chamber layer 204 is formed over the backside channel layer 210, and an orifice layer 208 is formed over the chamber layer 204.

The chamber layer 204 defines various fluid chambers 209 (one fluid chamber 209 is shown in FIG. 3). The orifice layer 208 defines various orifices 211. A fluid (a liquid agent) is delivered to the fluid chambers 209, and upon activation of a fluidic actuator (not shown), the fluid in the respective fluid chamber 209 is ejected through the corresponding orifice 211.

In some examples, each of the chamber layer 204 and the orifice layer 208 can be formed using an epoxy or another material.

In some examples, fluidic actuators include thermal-based fluidic actuators including heating elements, such as resistive heaters. When a heating element is activated, the heating element produces heat that can cause vaporization of a fluid to cause nucleation of a vapor bubble (e.g., a steam bubble) proximate the thermal-based fluidic actuator that in turn causes dispensing of a quantity of fluid, such as ejection from an orifice of a nozzle or flow through a fluid conduit or fluid chamber. In other examples, a fluidic actuator may be a piezoelectric membrane based fluidic actuator that when activated applies a mechanical force to dispense a quantity of fluid.

The substrate includes an interposer layer 212. An inlet 214 and an outlet 216 are formed in the interposer layer 212. The inlet 214 carries fluid (part of a fluid flow 215-1) received from the supply circulation path segment 124-S and provides the fluid to an inlet backside channel 218-1 in the backside channel layer 220.

The fluid flow 215-1 in the inlet backside channel 218-1 flows from the inlet backside channel 218-1 into an inlet feedhole 224-1 (FIG. 3) formed in the backside channel layer 210, and then into the corresponding fluid chamber 209. The fluid flow continues through the fluid chamber 209 and exits an outlet feedhole 224-2 (FIG. 3) formed in the backside channel layer 210, and flows to an outlet backside channel 218-2. The fluid (part of a fluid flow 215-2) flows through the outlet backside channel 218-2 and exits the outlet 216 in the interposer layer 212, and flows to the return circulation path segment 124-R.

The fluid flows 215-1 and 215-2 are part of the circulated fluid flow in the circulation path discussed above.

In the view of FIG. 2, a diagonal cut 203 is made in the layers 212, 210, 204, and 208 to show the feedholes 224-1 and 224-2, the fluid chamber 209, and an orifice 211 (FIG. 3). Note that the inlet backside channel 218-1 and the outlet backside channel 218-2 are at different sectional depths. The diagonal cut 203 allows both the inlet backside channel 218-1 and the outlet backside channel 218-2 to be visible in FIG. 2.

Additionally, in some examples, there are multiple inlet backside channels 218-1 and multiple outlet backside channels 218-2.

For each fluid chamber 209, a pair of fluid feedholes 224-1 and 224-2 are provided. Fluid is transferred from the inlet backside channel 218-1 through the inlet feedholes 224-1 to the corresponding fluid chambers 209. The fluid is then passed from the fluid chambers 209 through the corresponding outlet feedholes 224-2 to the outlet backside channel 218-2.

During operation of the additive manufacturing machine 100, circulated fluid flows from the fluid source 122 through the supply circulation path segment 124-S to the fluidic die shown in FIG. 2. The circulated fluid from the supply circulation path segment 124-S is passed through the inlet 214 of the interposer layer 212, and into the inlet backside channel 218.

The circulated fluid continues to flow from the inlet backside channel 218-1 through the inlet feedholes 224-1 to respective fluid chambers 209. The circulated fluid continues from the fluid chambers 209 through the outlet feedholes 224-2 to the outlet backside channel 218-2. The circulated fluid exits the outlet 216 and flows to the return circulation path segment 124-R.

In this way, any particles that have been ingested through respective orifices 211 into corresponding fluid chambers 209 are removed by the circulated flows away from the fluidic die. The particles carried by the circulated flow are removed by the filter 130 (FIG. 1).

Figure 4:
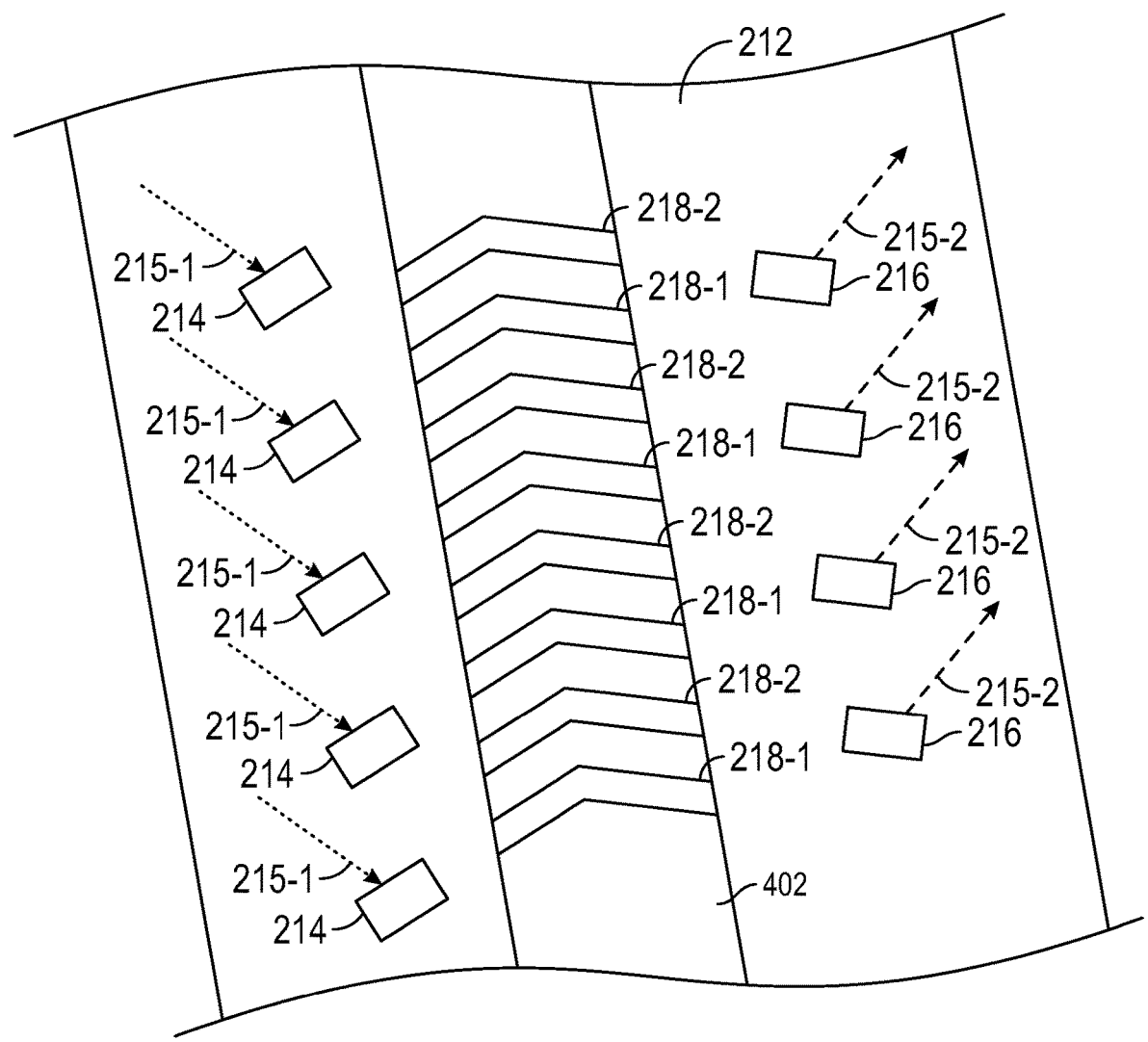
FIG. 4 is a bottom view of an interposer layer according to some examples.

FIG. 4 is a bottom view of the interposer layer 212 according to further examples. A central portion 402 of the interposer layer 212 has been cut away to illustrate inlet backside channels 218-1 and outlet backside channels 218-2 that are above the interposer layer 212. The inlet and outlet backside channels 218-1 and 218-2 are formed in the backside channel layer 210.

The inlets 214 receive fluid from the supply circulation path segment 124-S. The fluid received at the inlets 214 are transferred to respective inlet backside channels 218-1. The fluid in the inlet backside channels 218-1 are transferred through inlet feedholes 224-1 to corresponding fluid chambers 209. The fluid is then returned from the fluid chambers 209 through the outlet feedholes 224-2 to the outlet backside channels 218-2, and the fluid exits through respective outlets 216.

Figure 5:
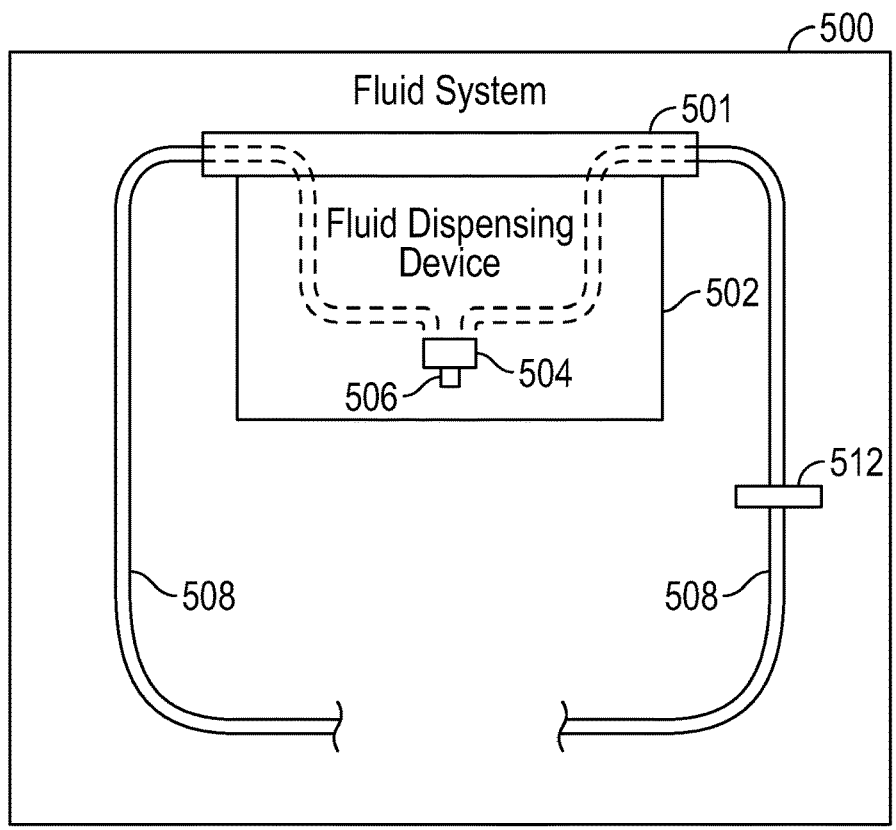
FIG. 5 is a block diagram of a fluid system according to some examples.

FIG. 5 is a block diagram of a fluid system 500. The fluid system 500 can be part of an additive manufacturing machine (e.g., 100 in FIG. 1). The fluid system 500 includes a support structure 501 to attach a fluid dispensing device 502 that has a fluid chamber 504 to contain a fluid, and an orifice 506 to dispense the fluid from the fluid chamber 504.

The support structure 501 can be the carriage 118 of FIG. 1, for example. The fluid dispensing device 502 may be removably attachable to the support structure 501, and may not be present until an end user attaches the fluid dispensing device 502 to the support structure 501.

The fluid system 500 further includes a circulation path 508 that has a path portion 510 in the fluid dispensing device 502. The circulation path 508 circulates a fluid flow through the fluid chamber 504 to remove, from the fluid chamber, a particle ingested through the orifice 506.

The fluid system 500 further includes a filter 512 in the circulation path 508 to remove the particle from the circulation path 508.

In some examples, the fluid system 500 can include a fluid source (e.g., 122 in FIG. 1) to supply a circulation path fluid for the circulation path 508.

In some examples, the fluid dispensing device 502 includes a fluidic die (e.g., the fluidic die shown in FIGS. 2 and 3).

In some examples, the fluidic die includes a layer (e.g., 212 in FIG. 2) having an inlet (e.g., 214 in FIG. 2) to the fluid chamber 504, and an outlet (e.g., 216 in FIG. 2) from the fluid chamber 504. The fluid flow transports a portion of a circulation path fluid through the inlet to the fluid chamber 504, and transports the first portion of the circulation path fluid from the fluid chamber 504 through the outlet.

In some examples, the fluidic die further includes a backside channel layer (e.g., 210 in FIG. 2) that has an inlet backside channel (e.g., 218-1 in FIG. 2) to carry the first portion of the circulation path fluid from the inlet to the fluid chamber 504, and an outlet backside channel (e.g., 218-2 in FIG. 2) to carry the first portion of the circulation path fluid from the fluid chamber to the outlet.

In some examples, the fluid dispensing device 502 is without any obstacles between the fluid chamber 504 and a backside channel that feeds the fluid to the fluid chamber 504.

In some examples, the fluid dispensing device 502 is to dispense the fluid to a powder surface, wherein the particle comprises a powder used for the powder surface.

Figure 6:
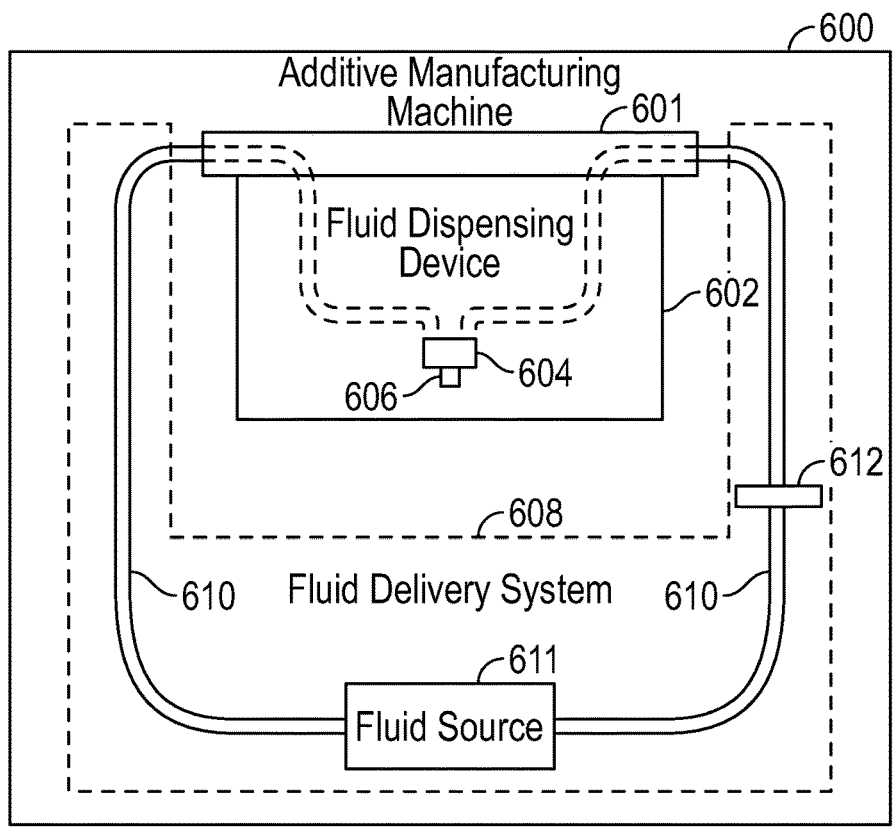
FIG. 6 is a block diagram of an additive manufacturing machine according to further examples.

FIG. 6 is a block diagram of an additive manufacturing machine 600 according to further examples. The additive manufacturing machine 600 includes a support structure 601 to attach a fluid dispensing device 602 that has a fluid chamber 604 to contain a fluid, and an orifice 606 to dispense the fluid from the fluid chamber 604 to a build bed of the additive manufacturing machine 600.

The additive manufacturing machine 600 includes a fluid delivery system 608 to deliver a fluid from a fluid source 611 to the support structure 601. The fluid delivery system 608 includes a circulation path 610 to circulate the fluid through the fluid chamber 604 to remove, from the fluid chamber 604, a particle ingested through the orifice 606.

The additive manufacturing machine 600 includes a filter 612 in the circulation path 610 to remove the particle from the circulation path 610.

Figure 7:
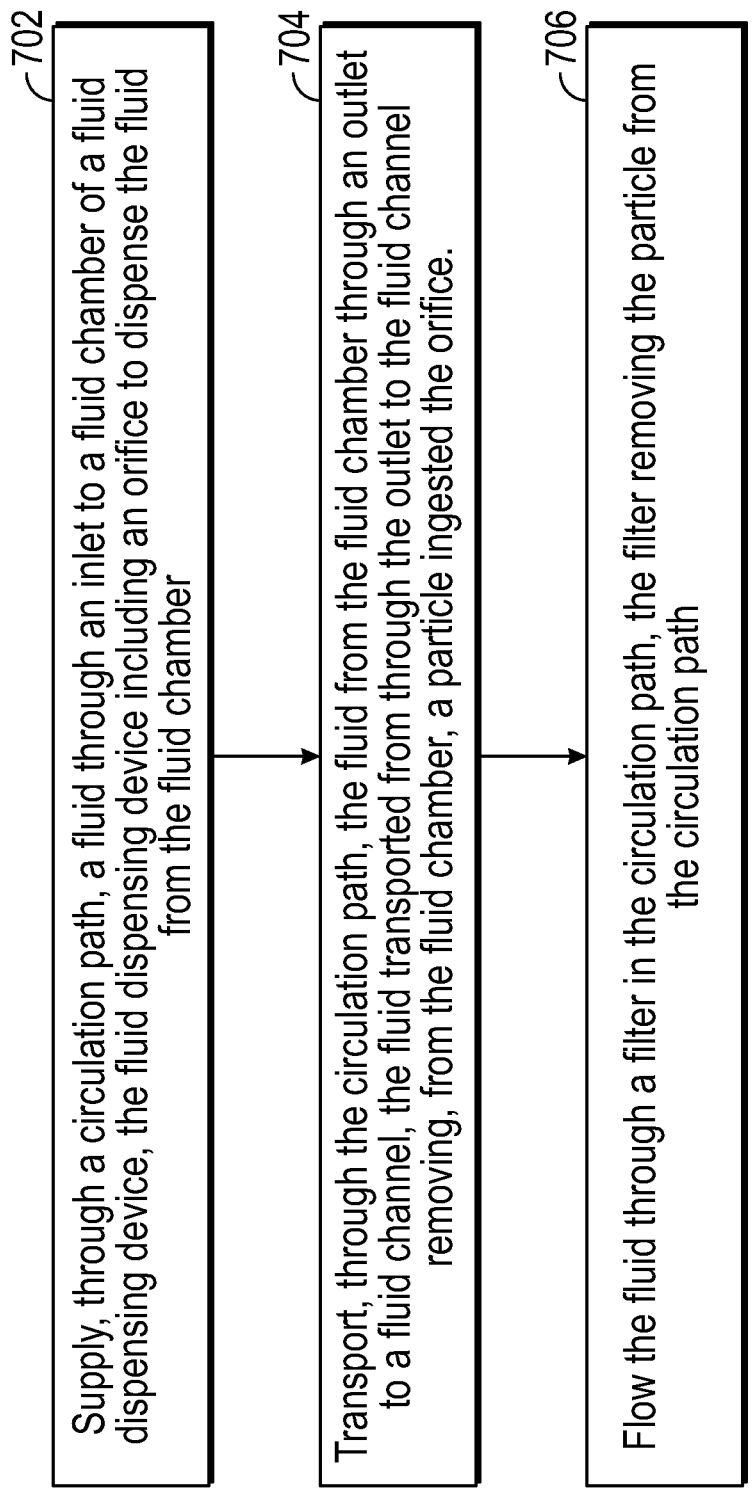
FIG. 7 is a flow diagram of a process according to some examples.

FIG. 7 is a flow diagram of a process according to some examples. The process includes supplying (at 702), through a circulation path, a fluid through an inlet to a fluid chamber of a fluid dispensing device, the fluid dispensing device including an orifice to dispense the fluid from the fluid chamber.

The process includes transporting (at 704), through the circulation path, the fluid from the fluid chamber through an outlet to a fluid channel, the fluid transported from through the outlet to the fluid channel removing, from the fluid chamber, a particle ingested through the orifice.

The process includes flowing (at 706) the fluid through a filter in the circulation path, the filter removing the particle from the circulation path.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A fluid system for an additive manufacturing system, the fluid system comprising:
   a fluid dispensing device comprising that comprises:
      a fluid chamber to contain a fluid;
      a printhead to dispense the fluid through an orifice onto a powder surface;
      a circulation path that comprises a supply circulation path segment to transport the fluid from the fluid chamber to the printhead, a return circulation path segment to transport the fluid from the printhead to the fluid chamber, and a filter within the return circulation path segment to remove, from within the return circulation path segment and prior to receipt at the fluid chamber, a powder particle ingested through the orifice from the powder surface;
      a sensor to detect a condition of the filter; and
      a support structure to attach the fluid dispensing device.

2. The fluid system of claim 1, further comprising a fluid source to supply the circulation path fluid for the circulation path.

3. The fluid system of claim 2, wherein the circulation path comprises:
   the supply circulation path segment to transport the circulation path fluid from the fluid source to the printhead, and
   the return circulation path segment to transport the circulation path fluid from the printhead to the fluid source.

4. The fluid system of claim 1, further comprising:
   a controller to receive measurement data of the sensor, and to output an indication of a condition of the filter in response to the measurement data.

5. The fluid system of claim 1, wherein the fluid dispensing device comprises a fluidic die.

6. The fluid system of claim 5, wherein the fluidic die comprises a first layer comprising an inlet to the fluid chamber, and an outlet from the fluid chamber, and wherein the fluid flow transports a first portion of a circulation path fluid through the inlet to the fluid chamber, and transports the first portion of the circulation path fluid from the fluid chamber through the outlet.

7. The fluid system of claim 6, wherein the fluidic die further comprises a backside channel layer comprising:
   an inlet backside channel to carry the first portion of the circulation path fluid from the inlet to the fluid chamber, and
   an outlet backside channel to carry the first portion of the circulation path fluid from the fluid chamber to the outlet.

8. The fluid system of claim 1, wherein the fluid dispensing device is without any obstacles between the fluid chamber and a channel to feed the fluid to the fluid chamber.

9. An additive manufacturing machine comprising:
   a support structure to attach a fluid dispensing device comprising:
      a fluid chamber to contain a fluid; and
      a printhead that comprises an orifice to dispense the fluid from the fluid chamber to a powder surface in a build bed of the additive manufacturing machine;
   a fluid delivery system to deliver a fluid from a fluid source to the fluid dispensing device, the fluid delivery system comprising a circulation path having a supply circulation path segment to transport the fluid from the fluid source to the orifice of the printhead, and a return circulation path segment to transport the fluid from the orifice of the printhead to the fluid chamber;
   a filter, in the return circulation path segment of the circulation path and prior to receipt at the fluid chamber, to remove a powder particle ingested through the orifice of the printhead from the powder surface from the return circulation path portion; and
   a sensor to detect a condition of the filter.

10. A method for an additive manufacturing system, the method comprising:
   supplying a fluid through a circulation path, a circulation path comprising:
      a supply circulation path segment that transports the fluid from a fluid chamber that contains a fluid to an orifice of a printhead of a fluid dispensing device;
      a return circulation path segment that transports the fluid from the printhead to the fluid chamber; and
      a filter in the return circulation path segment;
   transporting, through the return circulation path segment, the fluid from an outlet;
   flowing the fluid through the filter in the return circulation path segment, the filter removing a powder particle that is ingested through the orifice of the printhead from a powder surface from the return circulation path segment; and
   detecting, by a sensor associated with the circulation path, a condition of the filter.

11. The method of claim 10, wherein the circulation path comprises an inlet backside channel in the fluid dispensing device, and an outlet backside channel in the fluid dispensing device, the inlet backside channel to provide a fluid flow to the fluid chamber, and the outlet backside channel to receive fluid flow from the fluid chamber.

12. The fluid system of claim 1, wherein the fluid is a binding agent.

* * * * *